Aug. 3, 1943. H. MURTAGH ET AL 2,325,623
LOCATING BEARING FOR HORIZONTAL SHAFTS
Filed June 5, 1940 3 Sheets-Sheet 1

Inventors
HUGH MURTAGH
WILLIAM G. HARDING,
by Herbert H. Thompson
their Attorney

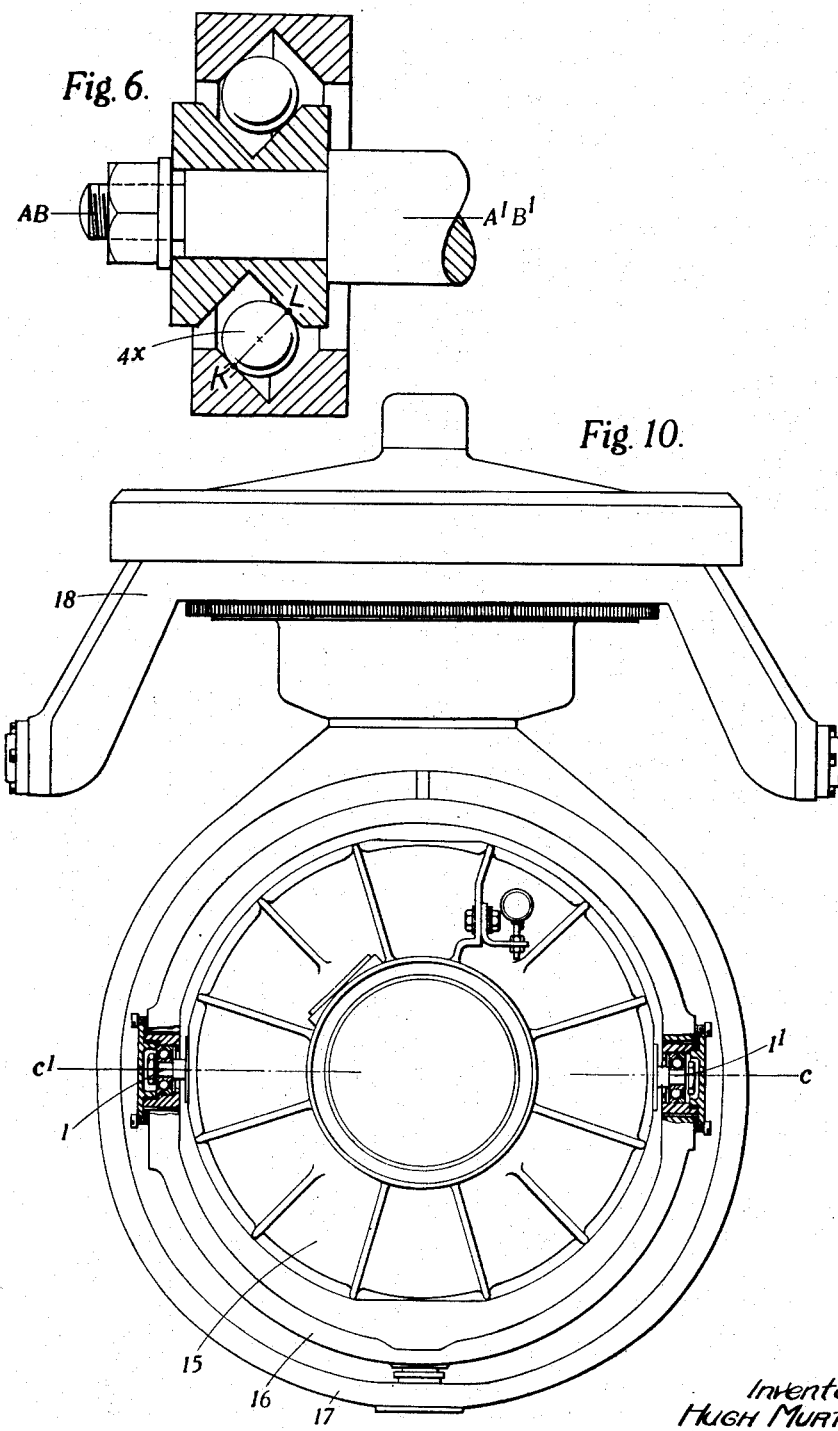

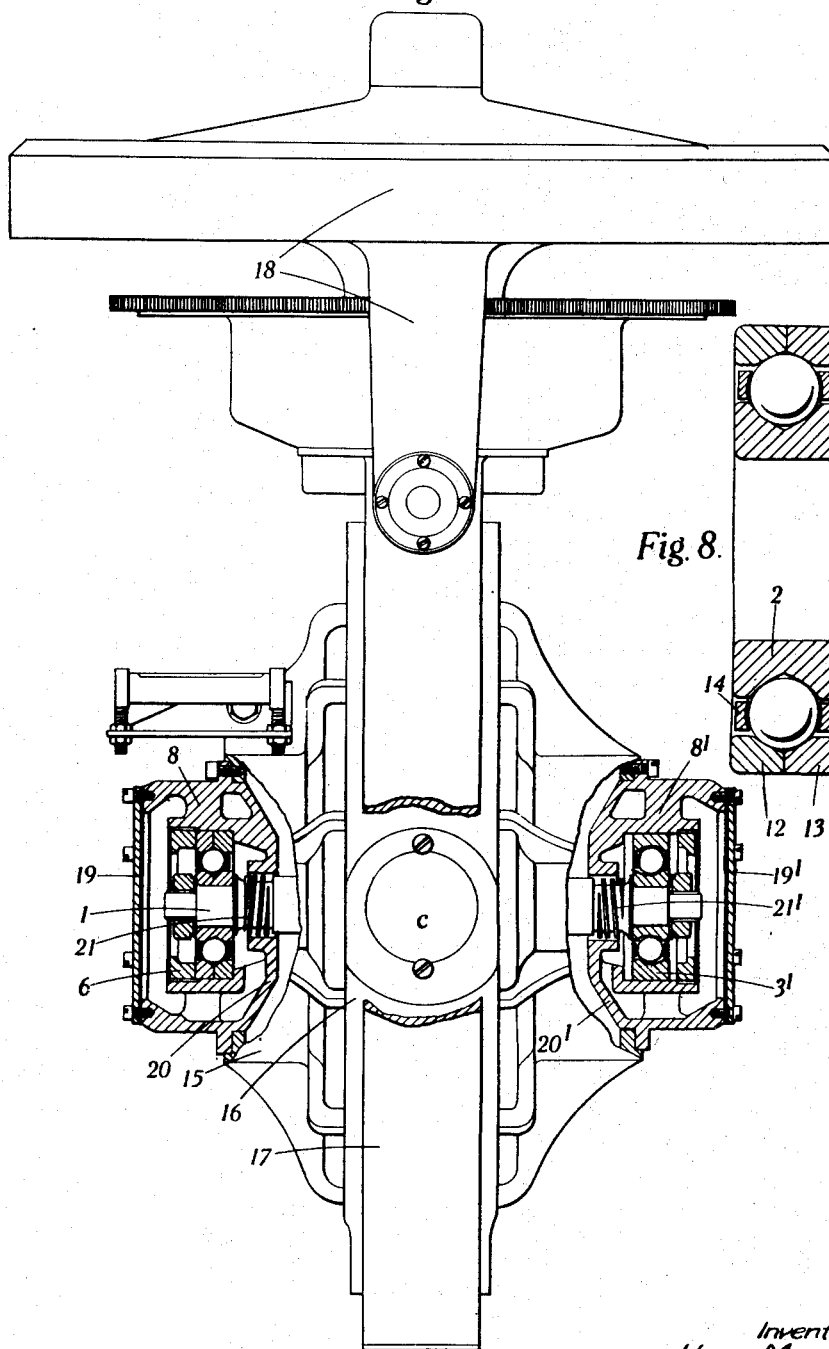

Patented Aug. 3, 1943

2,325,623

UNITED STATES PATENT OFFICE 2,325,623

LOCATING BEARING FOR HORIZONTAL SHAFTS

Hugh Murtagh, Laleham - on - Thames, and William George Harding, Whitton, England, assignors to Sperry Gyroscope Company Incorporated, Brooklyn, N. Y., a company of New York Application June 5, 1940, Serial No. 338,842
In Great Britain June 14, 1939

4 Claims. (Cl. 308—191)

This invention relates to bearings for horizontal and nearly horizontal shafts, and is concerned with bearings for locating such shafts without freedom of axial movement. The invention is more especially applicable to the bearings for gyroscope rotor shafts since in gyroscopic instruments and apparatus any axial movement of the rotor due to any cause disturb the balance and sets up a torque upon the gyroscope, resulting in undesirable precessional movement.

For gyroscope rotor shafts it has been customary to use as a locating bearing a so-called "deep-groove" bearing in which the ball races have in section a radius of curvature only very slightly greater than that of the balls and a depth that is an appreciable fraction of the radius of the ball, so that a slight axial movement of the shaft rapidly brings the balls into contact with the sides of the grooves thus preventing further movement. The slight movement permitted by these bearings is, however, greater than desirable, not only for the rotors of gyroscopic instruments, but for other purposes. The fundamental defect of a bearing of this type when used as a locating bearing is that, when it operates with the balls in central or zero position, the balls run on the centre tracks of the races, which are locally indistinguishable from cylinders, and are therefore unable to define the location. It is only after the shaft has moved axially to an extent sufficient to bring the balls on to a sloping part of the race, thereby forcing them outwards to take up radial play, that there is any resistance to axial movement. The inclination of the race upon which the balls run as the result of a small initial axial movement is very slight, so that the end play permitted is very much greater than the radial play in the bearing.

For these reasons it has been customary when using a "deep-groove" bearing to maintain it out of its central position by applying a force to the shaft in an axial direction, as, for example, by spring pressure applied to another bearing. The balls are then forced to run on a sloping track and radial play is taken up.

It has been found, however, that this arrangement is not entirely satisfactory. In forcing the balls out of the centre tracks of the races to run on other tracks on the sides of the grooves so as to take up radial play, the end of the rotor shaft is raised, and it therefore, tends to return under the action of gravity against the action of the spring. In other words the spring is required to support the weight of the rotor on a slope equivalent to the slope of the track, or a tangent thereto, actually in use. It will be clear that a considerable end thrust is necessary for this purpose and this end thrust increases the loading on the balls and therefore the friction and wear.

Another form of locating bearing in use for many purposes is a radial-and-thrust "double-V" bearing in which both the inner and outer races are approximately V-shaped in section. This bearing is used as a radial-and-thrust bearing where the thrust load is greater than the radial load. It has been used for heavy vertical shafts and for horizontal shafts which receive a heavy axial thrust or reaction in use. It has always been considered necessary to use such heavy thrust loading for these bearings, in order to ensure that the shaft is actually lifted up the incline of the V until radial play is completely taken up.

The present invention aims at the provision of bearings which do not suffer from the above-mentioned defects and with this end in view the invention consists in a method of supporting and axially locating a shaft or body on a substantially horizontal axis, wherein the support is provided by balls running between inner and outer races so sectioned as accurately to determine the axial position of the shaft without axial loading.

The invention further consists in a bearing for a substantially horizontal shaft or the like comprising balls running between inner and outer races each having side walls inclined to one another, and the balls and inner race being allowed to take up their relative positions without displacement by axial loading.

The invention also consists in a bearing for a substantially horizontal shaft comprising a row of balls between inner and outer races each in the form of a groove of substantially V-section, wherein the lowermost balls maintain contact with both walls of both grooves under normal operating conditions.

It will be noted that with a bearing according to the invention, in contradistinction to the principles heretofore advocated for double-V bearings, means are not provided to prevent radial movement of the shaft. The force of gravity is relied upon to hold the V-groove of the inner race central on the balls underneath the shaft, and to hold these central in the V-groove in the lower half of the outer race. If there acts upon the shaft an upward force greater than the weight of the shaft and rotor, the shaft moves upwards by the amount of the radial play existing in the bearing, and during this excursion the shaft is not located axially. In many devices, however, as, for example, where the shaft is the rotor shaft of a gyroscope, these conditions never arise, and the existence of such radial play is unimportant. It will be noted that the invention can be employed with bearings in which there is considerable radial play; in fact, a bearing may have considerable play in all directions when tested by itself, and yet it may locate the shaft with complete accuracy under load conditions when used in accordance with the invention.

It is also to be appreciated that in bearings used in the manner herein indicated, each ball runs without load for practically half a revolution. During this time it readily acquires a film of oil so that lubrication is facilitated.

It will also be noted that only one bearing arranged in accordance with the invention for a rotating shaft need be employed as a locating bearing. It is disadvantageous to make more than one bearing act as a locating bearing and ordinary radial bearings may be used for all other bearings that the shaft may require.

The invention will be clearly understood from the following description of various forms (given, however, merely by way of example) which it may assume, and this description will be more readily followed by reference to the accompanying drawings wherein Fig. 1 represents one end of a shaft supported by "deep-groove" radial bearings of ordinary type, certain features such as radial play being shown greatly exaggerated;

Fig. 6 represents diagrammatically the conditions holding in a V bearing such as that shown in Fig. 5 under axial load (e. g., when it is used in the arrangement shown in Fig. 2), in order to take up play in the bearings;

Fig. 8 represents a bearing which when used under heavy axial loading has been employed for known purposes;

Fig. 9 shows a bearing according to the invention applied to locating the rotor of a gyroscope in its case; and Fig. 10 shows a bearing according to the invention applied to locating the rotor case of a gyro compass in a supporting vertical ring.

Figure 1:
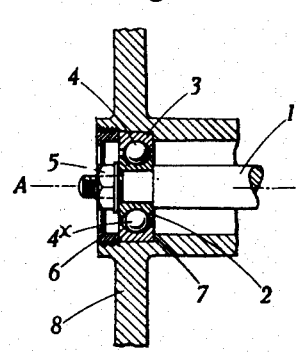

The defects of known bearings and the principles underlying the present invention will be appreciated by studying Figs. 1 to 6 of the accompanying drawings wherein a shaft 1 is mounted in ball bearings at each end for rotation about its axis AA'. In Fig. 1 only one bearing for one end of the shaft is shown. The bearing comprises an inner race 2 and an outer race 3 and a row of balls running between the races. The inner race is retained on the shaft by a nut 5 and the outer race 3 is retained between a ring nut 6 and a seating 7 in the bearing housing 8.

In any such bearing there is always a small amount of radial play generally a very small fraction of a thousandth of an inch, as a result of which the shaft A can be moved not only radially but also axially through a small distance. For many purposes such uncertainty in the location of the shaft is undesirable. For example, if the shaft is the shaft of a grinding wheel or of a body being machined, accurate work is impossible unless the shaft is accurately located without play. If the shaft is the rotor shaft of a gyroscope, e. g., in a pyroscopic compass, a minute longitudinal shift in the position of the rotor may upset the balance of the gyroscope about one of its gimbal axes, thus resulting in the application of a gravitational torque which causes the gyroscope to precess from its correct position.

Figure 2:
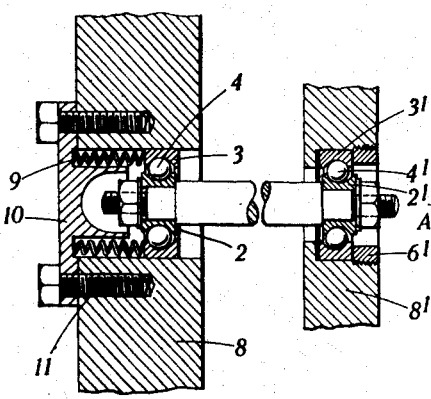
Fig. 2 represents diagrammatically the conditions holding when a shaft supported at each end in bearings such as shown in Fig. 1 is forced axially by pressure applied to the outer race of one of the bearings until radial play in both bearings is taken up.

For the above reasons it is usual to provide an axial load on the bearings as shown in Fig. 2. In this arrangement the outer race 3 is not clamped into a fixed position in the bearing housing 8, but is slidably mounted in it, and a number of springs 9 act between it and a backing plate 10 which is secured to the bearing housing 8 by bolts 11. The thrust of the springs 9 acting on the outer race 3 is communicated by the balls 2 to the inner race 2 and the shaft 1, which is thus moved to the right as seen in Fig. 2. This movement, in turn, is communicated by the inner race 2' of the right hand bearing by way of the balls 4' to the outer race which is thus forced against the ring nut 6'. In Fig. 2 the bearing 2', 3' is the locating bearing for the shaft while the bearing 2, 3, is a floating bearing. It is plain that in this arrangement all bearing play, both radial and axial, is taken up. In addition, temperature expansion effects are compensated; thus, if the bearing housing 8, 8' expand away from each other more than the shaft expands, the springs 9 cause the bearings 3 to move to the right relatively to the bearing housing 8. Nevertheless, it is found that for many purposes, e. g., for gyroscopic instruments, this method of spring loading the bearings is unsatisfactory, for reasons that will be made evident in connection with Figs. 3 to 6.

Figure 3:
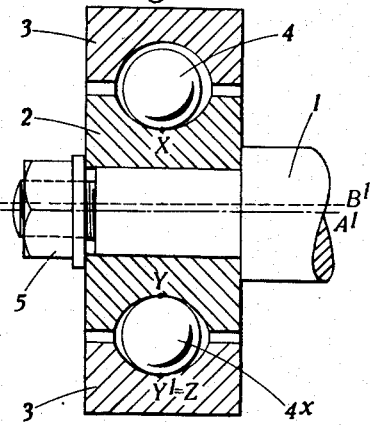
Fig. 3 represents diagrammatically an enlarged section of a bearing and balls in the arrangement shown in Fig. 1.

In Fig. 3 a bearing similar to that in Fig. 1 is shown on an enlarged scale with a greatly exaggerated amount of radial play. Since the weight of the shaft 1 rests on the lower balls $4^x$ the radial play results in a clearance between the upper balls 4 and the outer race 3. The result is that the axis AA' of shaft 1 lies below the axis of symmetry BB' of the outer race 3. The balls 4, $4^x$ lie in the central plane of the ball races, and make contact with the races at points, X, Y, Y' in this central plane.

Figure 4:
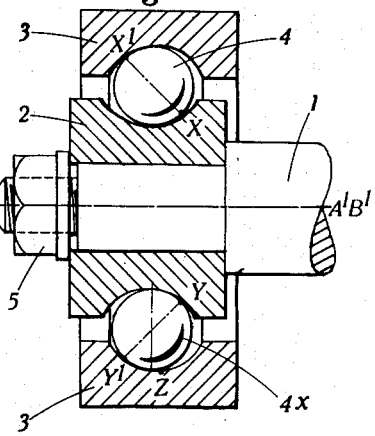
Fig. 4 represents diagrammatically an enlarged section of a bearing and balls in the arrangement shown in Fig. 2.

In Fig. 4 the same bearing is shown under the spring-loading conditions of Fig. 2. The outer race 3 is displaced slightly to the right relatively to the inner race 2, this displacement being shown greatly exaggerated. Since radial play is taken up, the upper balls 4 as well as the lower balls $4^x$ make contact with both the outer and inner races. The balls now make contact with the races at points XX', YY' not in the central plane of the bearing, i. e., not at the bottom of the grooves, but on the sides so that the lines XX', YY' are inclined to the vertical. Because the ball $4^x$ makes contact with race 3 at the point Y' instead of at the lowest point Z, as in Fig. 3, its centre is raised. Since the same conditions hold good at both ends of the shaft the shaft 1 is raised until its axis AA' coincides with BB'. The shaft has therefore been moved upwards and to the right; it is vertically supported on an inclined plane by the springs 9.

Figure 5:
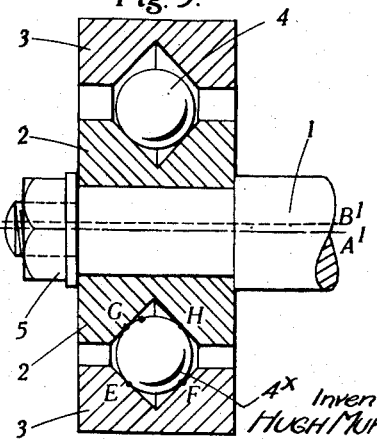
Fig. 5 represents diagrammatically a section of a V bearing capable of use in place of the deep-groove bearing such as shown in Fig. 3 for supporting a shaft in the arrangement shown in Fig. 2.

In Fig. 5 there is shown a V-bearing analogous in some respects to the deep groove bearing of Fig. 3. In Fig. 5 the lower balls $4^x$ are shown as touching the V groove in the outer race 3 at points EF and is touching the V groove in the race 2 at points GH. The shaft is then in its lowest position and it is obvious that any movement to the right must be accompanied by a movement upwards so that its path is parallel to a line EH.

In Fig. 6 the same bearing is shown in the position it would assume if it replaced the deep groove bearings of Fig. 2 under the same spring-loading conditions. It has been supposed that the springs 9 have actually moved the shaft upwards and to the right until all radial play has been removed and axis AA' coincides with axis BB'. The balls $4^x$ touch the sides of the V grooves at points KL near the middle of the sloping sides of the groove. (As far as the normal reactions of the balls on the grooves are concerned the ball $4^x$ might take up any position in the groove displaced from the position KL in a direction perpendicular to KL. The actual position assumed by the balls is determined by auxiliary forces acting on them, e. g., their weight, centrifugal force, friction, and forces acting from any ball cage provided.)

From the above considerations it follows that, if the shaft 1 is to be maintained in a position displaced to the right by an amount sufficient to eliminate play, the weight of the shaft and any body mounted on it must be supported on a slope equal to the slope of the sides of the groove. It follows also that the shaft and rotor tend to return down this slope under the influence of their weight. To support them the springs 9 must apply to the shaft an axially directed force which, if the slope of the sides of the V groove is 45°, must be at least equal to the weight of the shaft and rotor. Actually a considerably greater axial force than this is necessary to ensure that friction between the outer race 3 and the bearing housing 7 is overcome, and to allow for possible axial loads applied to the rotating shaft in use.

It has been generally recognized that V bearings must be loaded axially by a very heavy force if all play is to be taken up, and it is the universal practice to ensure that, whenever V-bearings are used for accurately locating a shaft, they are very heavily loaded in an axial direction. This has the result that friction and wear are greatly increased, but it has hitherto been considered that this disadvantage must be incurred if accurate location of the shaft without play is to be obtained.

Figure 7:
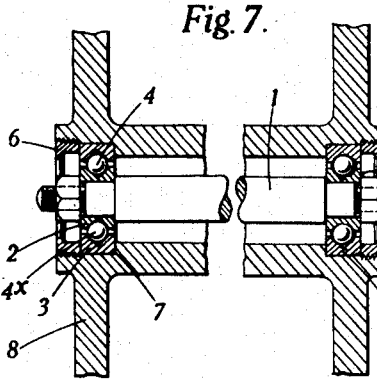
Fig. 7 represents diagrammatically the principle used for locating rotatable shafts in accordance with the invention.

In carrying the invention into effect in one convenient manner, in order to remove the defects and disadvantages discussed above, a shaft may be mounted in the manner illustrated in Fig. 7 of the accompanying drawings. In this arrangement there is secured to the shaft 1 an inner race 2 having a V-groove ball track. The outer race 3 also has a V-groove ball track, and a row of balls 4, $4^x$ runs between the two races. The outer race 3 is locked in a fixed position in the bearing housing 8 by clamping it against the bearing seating face by the ring nut 6. No spring thrust is applied to the shaft which rests with both sides of the V-groove of the inner race 2 in contact with the lower balls $4^x$ of the bearing which in turn rest in the V-groove of the outer race 3 in order to touch both walls of the V-groove. The conditions holding good in this bearing are thus exactly those illustrated in Fig. 5. Radial play in the bearing is illustrated by a clearance, very greatly magnified in both Fig. 7 and Fig. 5 between the upper ball 4 and the outer race 3.

In order not to interfere with the conditions holding good in the locating bearing, the other end of the shaft 1 is preferably carried in a non-locating bearing which may be a plain bearing or may be a shallow groove bearing of the usual known type of radial bearing such as shown in Fig. 7. Provided that the spacings between the outer races 3, 3' and between the inner races 2, 2' are carefully controlled in manufacture, a shallow groove bearing can conveniently be used as the non-locating bearing at the right hand end of the shaft, since the amount of axial motion which can take place in such a bearing is sufficiently great to compensate for thermal expansion.

Fig. 8 shows a known type of bearing which has the main characteristics of a V-bearing, and may be used in carrying the invention into effect. The outer race is split, i. e., is formed by two rings 12, 13. The grooves both in the inner race 2 and the outer race are in the shape of a V the sides of which are concave. The balls are located circumferentially in the groove by the usual type of ball cage 14.

It will be noted that owing to the presence of radial play in the bearing, only some of the balls transmit pressure between the inner and outer races. The balls 4 in the upper part of the bearing run on the V groove in the inner race and do not make contact with the outer race. As a consequence of this they readily acquire a film of oil, and lubrication is thus facilitated.

Fig. 9 represents the rotor of a gyroscope mounted in bearings in accordance with the invention. The rotor shaft 1 is carried in bearing housings 8, 8' located in the rotor case 15. The case 15 is pivotally mounted for rotation about the axis CC' (normal to the plane of the paper in Fig. 9) in a vertical ring 16. This ring is pivotally mounted for rotation about a vertical axis in a ring 17 which is driven by a servo-motor to turn about the same vertical axis in a gimbal-supported frame 18 so as to be maintained coplanar with the vertical ring 16. Normally the rotor case 15 is balanced about the axis CC' but it is evident that, if the rotor were to become displaced axially in the rotor case, the condition of balance would be disturbed and a torque would act about the axis CC', causing the gyroscope to precess round the vertical axis and introducing errors in indications given by the instrument.

In order to avoid such disturbance the shaft 1 is located in the housing 8 by a bearing of the type shown in Fig. 8, the outer race being secured against its seating by the ring nut 6. At the other end of the shaft a form of non-locating bearing is used consisting of a standard deep-groove radial bearing, the outer race 3' of which is free to move axially in the bearing housing 8'.

The housings 8 and 8' are provided with cover plates 19, 19' and with walls 20, 20' extending inwards towards the shaft from which they have only a small clearance. In this way a space is formed round the bearings which is filled with oil to the level of the lowest balls in the bearing.

The shaft 1 is provided at each end with screw threads 21, 21' which expel any oil collected by the ends of the shaft 1 when the rotor is rotating.

The invention may also be applied with advantage to support a body not undergoing continuous rotation, but mounted for pivotal freedom about an axis. In Fig. 10 it is shown as applied to the support of the rotor case 15 of the compass shown in Fig. 9. The rotor case is provided with two pivots 1, 1' which take the place of the continuous shaft 1 of the previous drawings. The arrangements are otherwise the same as shown in Fig. 9 except that it is preferred to use for the bearing for the pivot 1' a deep-groove radial bearing having a loose fitting.

What we claim is:

1. A mounting for a substantially horizontal shaft in gyroscopic apparatus comprising spaced ball bearings for said shaft; one of said bearings including a fixedly mounted, grooved, outer ball race; an axially movable, grooved, inner ball race and four point contacting ball bearings between said races by which the shaft is normally positioned axially to accurately locate the gyroscopic parts solely by means of the force of gravity thereon; the other of said bearings of the mounting being of the non-locating type and including a fixedly mounted, grooved, outer ball race; an axially movable, grooved, inner ball race and contacting ball bearings therebetween.

2. A ball bearing mounting as claimed in claim 1 in which the substantially horizontal shaft is the rotor shaft of the gyroscopic apparatus.

3. A ball bearing mounting as claimed in claim 1 in which the substantially horizontal shaft is the shaft of the rotor bearing frame of the gyroscopic apparatus.

4. A ball bearing mounting as claimed in claim 1 in which the grooved ball races of the locating bearing are substantially V-shaped in cross-section.

HUGH MURTAGH.
WILLIAM GEORGE HARDING.